United States Patent
Uzawa et al.

(10) Patent No.: US 11,947,507 B2
(45) Date of Patent: Apr. 2, 2024

(54) TRAFFIC MONITORING DEVICE, TRAFFIC MONITORING METHOD, AND TRAFFIC MONITORING PROGRAM

(71) Applicant: Nippon Telegraph and Telephone Corporation, Tokyo (JP)

(72) Inventors: Hiroyuki Uzawa, Tokyo (JP); Shuhei Yoshida, Tokyo (JP); Namiko Ikeda, Tokyo (JP); Koyo Nitta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/925,230

(22) PCT Filed: May 26, 2020

(86) PCT No.: PCT/JP2020/020705
§ 371 (c)(1),
(2) Date: Nov. 14, 2022

(87) PCT Pub. No.: WO2021/240634
PCT Pub. Date: Dec. 2, 2021

(65) Prior Publication Data
US 2023/0188439 A1    Jun. 15, 2023

(51) Int. Cl.
*G06F 16/22*    (2019.01)
*H04L 9/40*    (2022.01)
(Continued)

(52) U.S. Cl.
CPC .......... *G06F 16/22* (2019.01); *H04L 41/0677* (2013.01); *H04L 41/12* (2013.01);
(Continued)

(58) Field of Classification Search
CPC .. G06F 16/22; G06F 16/24568; G06F 3/0482; G06F 16/137; G06F 16/285;
(Continued)

(56) References Cited

U.S. PATENT DOCUMENTS

| 8,665,699 B2* | 3/2014 | Bellagamba | ........ H04L 41/0677 370/242 |
| 8,958,318 B1* | 2/2015 | Hastwell | ............. H04L 63/1408 370/252 |

(Continued)

FOREIGN PATENT DOCUMENTS

| JP | 2000196593 A | 7/2000 |
| JP | 4955722 B2 | 6/2012 |

(Continued)

OTHER PUBLICATIONS

Ikeda et al., "Virtualization-enabled traffice monitoring system with built-in hardware accelerator", The Institute of Electronics, 2020 General Meeting of the Institute of Electronics, Information and Communications Technology, Mar. 17-20, 2020, p. 66. As described in the specification.

*Primary Examiner* — Kyung H Shin
(74) *Attorney, Agent, or Firm* — Slater Matsil, LLP (57) ABSTRACT

A traffic monitoring apparatus that monitors traffic of a monitoring target network and includes a statistical information processor that acquires statistical information per specific flow of the traffic, and a packet capture unit that captures a packet of the specific flow, in which the statistical information processor includes a statistical information aggregation unit that aggregates the pieces of statistical information, and a statistical information file generation unit that generates a statistical information file based on the pieces of aggregated statistical information.

16 Claims, 7 Drawing Sheets

(51) Int. Cl.
  *H04L 41/0677* (2022.01)
  *H04L 41/12* (2022.01)
  *H04L 43/026* (2022.01)
  *H04L 43/028* (2022.01)
  *H04L 43/062* (2022.01)
  *H04L 67/50* (2022.01)

(52) U.S. Cl.
  CPC .......... *H04L 43/026* (2013.01); *H04L 43/028* (2013.01); *H04L 43/062* (2013.01); *H04L 63/1408* (2013.01); *H04L 67/535* (2022.05)

(58) Field of Classification Search
  CPC .. G06F 16/9535; G06F 16/235; G06F 16/248; G06F 16/29; G06F 21/6218; H04L 65/60; H04L 63/1408; H04L 43/028; H04L 41/0677; H04L 45/50; H04L 45/28; H04L 45/22; H04L 41/40; H04L 41/0659; H04L 43/20; H04L 43/0805; H04L 41/12; H04L 43/026; H04L 63/1433; H04L 47/20; H04L 67/01; H04L 43/12; H04L 47/2441; H04L 47/31; H04L 41/16; H04L 43/0858; H04L 41/22; H04L 43/062; H04L 45/66; H04L 63/0263; H04L 43/02; H04L 67/535; G06Q 10/101
  See application file for complete search history.

(56) References Cited

U.S. PATENT DOCUMENTS

| | | | |
|---|---|---|---|
| 2016/0234167 A1* | 8/2016 | Engel | H04L 63/1408 |
| 2016/0359917 A1* | 12/2016 | Rao | H04L 41/12 |
| 2019/0124169 A1* | 4/2019 | Sundin | H04L 67/535 |
| 2019/0294598 A1* | 9/2019 | Hsiao | G06F 16/22 |

FOREIGN PATENT DOCUMENTS

| | | |
|---|---|---|
| JP | 2013219435 A | 10/2013 |
| JP | 2018088646 A | 6/2018 |

* cited by examiner

TRAFFIC MONITORING DEVICE, TRAFFIC MONITORING METHOD, AND TRAFFIC MONITORING PROGRAM

CROSS-REFERENCE TO RELATED APPLICATIONS

This application is a national phase entry of PCT Application No. PCT/JP2020/020705, filed on May 26, 2020, which application is hereby incorporated herein by reference.

TECHNICAL FIELD

The present disclosure relates to techniques for monitoring traffic in a network.

BACKGROUND

There are provided a variety of services using VMs (Virtual Machines) and the like, as a result of evolution of virtualization technology in network functions virtualization (NFV) and software defined networking (SDN). In order to manage operation of these services, traffic statistical information (the number of packets, the number of bytes, jitter, latency, and the like) of each flow (aggregate of packets having the same rule of combination of source/destination MAC address, IP address, and the like) flowing on a virtual network is monitored in real time, and when a failure occurs, the packet of the corresponding flow is captured to analyze a cause. The packet is also captured not only when a failure occurs but also for network quality monitoring related to voice quality such as delay and jitter, in addition to acquisition of statistical information.

In order to achieve the above processing, a statistical information processing device (NPL 1) having a function of acquiring traffic statistical information for each flow and a packet capture device (PTL 1) having a function of filtering and capturing only a packet of a specific flow have been disclosed respectively.

Figure 7:
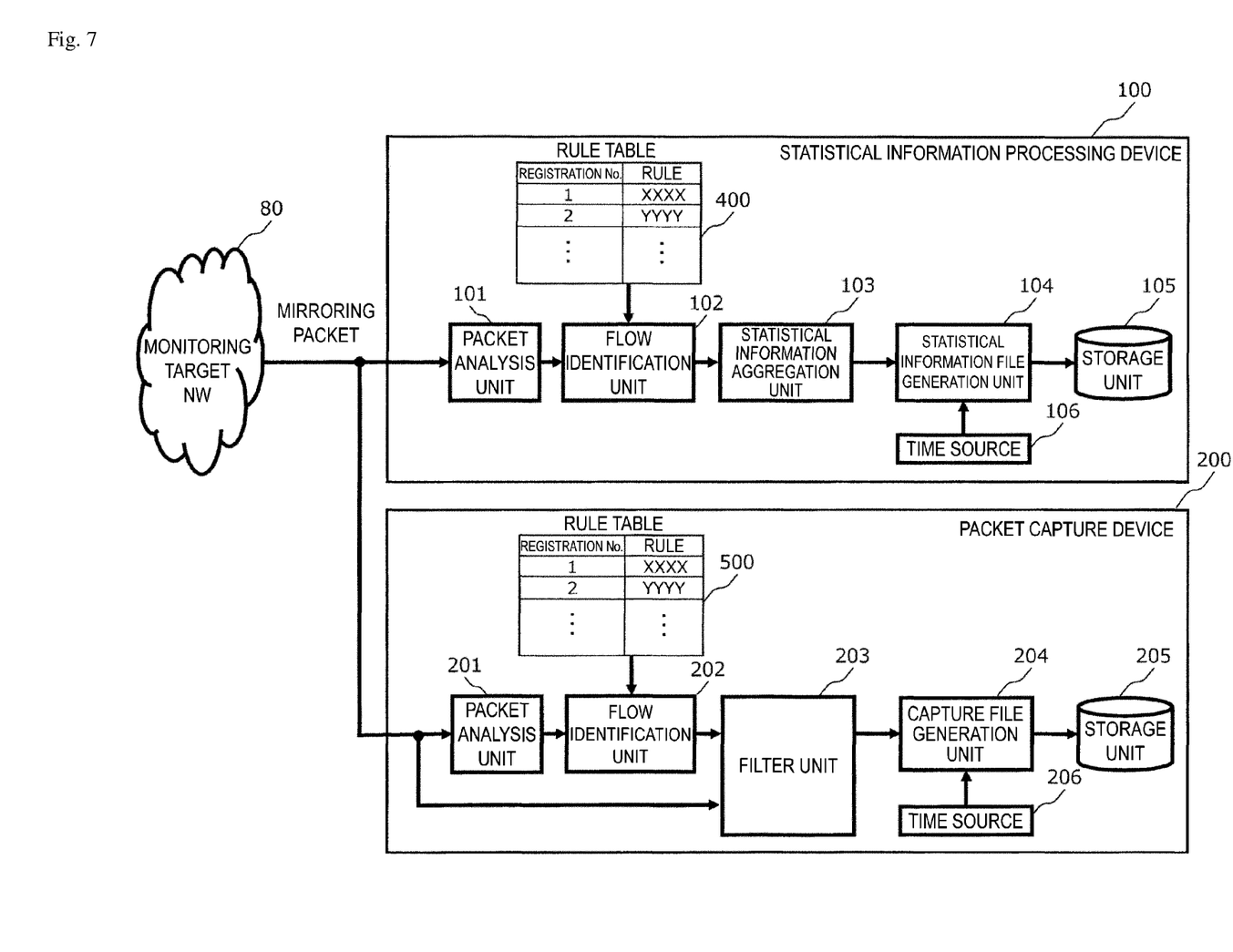
FIG. 7 is a block diagram illustrating a configuration of a related-art traffic monitoring apparatus.

FIG. 7 illustrates a configuration example of the statistical information processing device and the packet capture device. The statistical information processing device receives, as input, a duplicate packet of a packet flowing through a monitoring target network (NW) by tapping from the outside of the NW and includes a packet analysis unit for extracting a header used to identify a flow from the input packet, a flow identification unit that identifies the flow based on the extracted header, a statistical information aggregation unit that updates statistical information corresponding to the identified flow, a statistical information file generation unit that periodically collects a statistical information aggregation result and outputs a statistical information file after stamping time when the aggregation is completed, and a storage unit #1 for storing the statistical information file.

On the other hand, the packet capture device includes, in addition to the packet analysis unit and the flow identification unit, a filter unit that outputs only the packet of the flow to be captured to a subsequent stage, a capture file generation unit that converts capture data in which, for a plurality of packets, contents of the output packet and a capture time of the packet are bundled into a file, and a storage unit #2 for storing the capture file.

CITATION LIST

Non Patent Literature

NPL 1: Ikeda et al., "Traffic Monitoring System for Network Virtualization with Hardware Accelerator (1)~System Architecture to Achieve Traffic Visualization~", The Institute of Electronics, Information and Communication Engineers General Conference, Mar. 17-20, 2020

Patent Literature

PTL 1: JP 4955722 B

SUMMARY

Technical Problem

The traffic analysis is performed by using the statistical information files and the capture files held by these devices and collating the statistical information with the capture data based on the time stamped on each file. However, because both devices are independent of each other and are not always time synchronized, a difference occurs between a time when the statistical information processing device stamps on the statistical information and a time when the packet capture device stamps on the captured packet, so that the collation becomes difficult and the traffic analysis becomes difficult.

Here, although there is also conceivable a method of synchronizing the time between the statistical information processing device and the packet capture device, unfortunately a time source device that outputs a reference time is used for each device, and the number of devices used to construct a system increases.

The present disclosure has been made to solve the above-described problems, and an object of the present disclosure is to provide a traffic monitoring apparatus capable of simplifying traffic analysis, which uses a statistical information file and a capture file, and achieving traffic analysis with fewer devices.

Means for Solving the Problem

In order to solve the above-described problems, a traffic monitoring apparatus of the present disclosure is a traffic monitoring apparatus that monitors traffic of a monitoring target network and includes a statistical information processing unit that acquires statistical information per specific flow of the traffic, and a packet capture unit that captures a packet of the specific flow, in which the statistical information processing unit includes a statistical information aggregation unit that aggregates a plurality of pieces of the statistical information, and a statistical information file generation unit configured to generate a statistical information file based on the plurality of pieces of the statistical information aggregated, the packet capture unit includes a filter unit that filters the packet of the specific flow, and a capture file generation unit that generates a capture file by using the filtered packet, and by using time information supplied from an identical time source, the statistical information file generation unit generates the statistical information file and the capture file generation unit generates the capture file.

In order to solve the above-described problems, a traffic monitoring method of the present disclosure is a traffic monitoring method in a traffic monitoring apparatus that monitors traffic of a monitoring target network and includes a statistical information processing unit that acquires statistical information per specific flow of the traffic and a packet capture unit that captures a packet of the specific flow, and includes aggregating, by the statistical information processing unit, a plurality of pieces of the statistical information to generate a statistical information file based on the plurality of pieces of the statistical information aggregated, and filtering, by the packet capture unit, the packet of the specific flow to generate a capture file based on the filtered packet, in which by using time information supplied from an identical time source, the statistical information file is generated in the aggregating and the capture file is generated in the filtering.

In order to solve the above-described problems, the traffic monitoring program of the present disclosure causes the computer to execute steps of the traffic monitoring method described above.

Effects of Embodiments of the Invention

The present disclosure can provide a traffic monitoring apparatus capable of simplifying traffic analysis, which uses the statistical information file and the capture file, and achieving traffic analysis with fewer devices.

DETAILED DESCRIPTION OF ILLUSTRATIVE EMBODIMENTS

Hereinafter, embodiments of the present disclosure will be described based on the drawings. The present disclosure is not limited to the following embodiments.

First Embodiment

Figure 1:
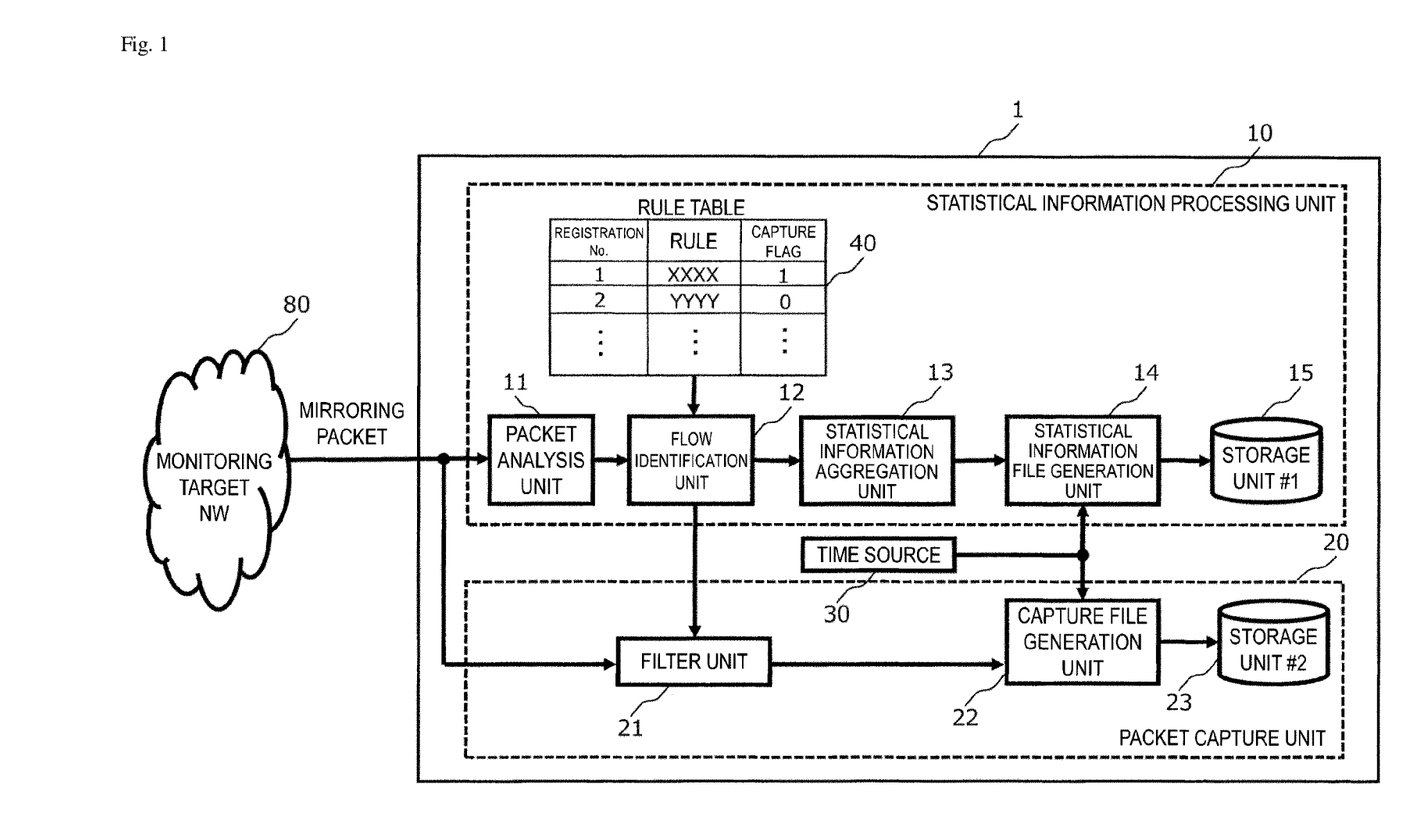
FIG. 1 is a block diagram illustrating a configuration of a traffic monitoring apparatus according to a first embodiment of the present disclosure.

A first embodiment of the present disclosure will be described. FIG. 1 is a block diagram illustrating a configuration of a traffic monitoring apparatus according to the first embodiment of the present disclosure.

Configuration of Traffic Monitoring Apparatus

A traffic monitoring apparatus 1 is different from the related art in that a statistical information processing unit 10 and a packet capture unit 20 are provided on the same apparatus, a statistical information file and a capture data file are generated by using time information supplied from the same time source 30, and a packet analysis unit and a flow identification unit for identifying a flow of an input packet are shared by the statistical information processing unit 10 and the packet capture unit 20.

The statistical information processing unit 10 includes a packet analysis unit 11 for receiving, as input, a duplicate packet (mirroring packet) from a monitoring target network 80 and extracting a header used to identify a specific flow from the input packet, a flow identification unit 12 that identifies the specific flow based on the extracted header, a statistical information aggregation unit 13 that aggregates pieces of statistical information corresponding to the identified flow, a statistical information file generation unit 14 that periodically aggregates statistical information aggregation results and generates a statistical information file, and a storage unit 15 for storing the generated statistical information file.

In the packet analysis unit 11, the mirroring packet input from the monitoring target network 80 is analyzed to extract the header in order to identify a flow from which statistical information is to be acquired.

The flow identification unit 12 includes a rule table 40 that records a rule corresponding to the flow from which the statistical information is to be acquired. The flow identification unit 12 identifies a specific flow from which the statistical information is to be acquired by sequentially matching and comparing each rule recorded in the rule table and the header extracted by the packet analysis unit 11.

The statistical information aggregation unit 13 aggregates the statistical information corresponding to the identified flow. The statistical information file generation unit 14 periodically aggregates the statistical information aggregation result, and stamps time to generate the statistical information file by using the time information at an aggregation completion time point supplied from the time source 30. The storage unit 15 stores the generated statistical information file.

The rule table 40 can record, for example, header field information of a source/destination MAC address and a source/destination IP address as a rule for identifying the flow. The information for identifying the flow is not limited thereto, and the header field information such as a source/destination port number and a protocol type may be recorded as the rule for identifying the flow.

In the present embodiment, in order to allow the statistical information processing unit 10 and the packet capture unit 20 to share the identifying of the flow from which the statistical information is to be acquired, a capture flag value (1: capture target, 0: non-capture target) indicating whether the flow is a capture target is newly added to each rule recorded in the rule table 40, the packet of the flow that matches a rule in the rule table 40 is notified to the statistical information aggregation unit 13, and the capture flag value of the rule is notified to a filter unit 21 of the packet capture unit 20.

The packet capture unit 20 includes the filter unit 21 that outputs only the packet of a capture target flow to a subsequent stage, a capture file generation unit 22 that converts capture data bundled for a plurality of packets into a file by using a content of the output packet and a capture time of the packet supplied from the time source 30, and a storage unit 23 for storing the capture file.

The filter unit 21 has a function of filtering the packet that is a capture target. The filter unit 21 temporarily buffers the input packet and waits for notification of the capture flag value for the buffered packet from the flow identification unit 12. When the notified capture flag is 1, the filter unit 21 outputs the packet from the buffer to the capture file generation unit 22 in the subsequent stage, and when the capture flag is 0, the filter unit 21 discards the buffered packet from the buffer. Here, when the input packet does not match all the rules recorded in the rule table 40, the filter unit 21 is notified of 0 as the capture flag value.

Here, the packet capture unit 20 may be configured to be able to set start/end of capture. In a case where capture is not being performed, such as a case where the end of the capture is set, the filter unit 21 discards the input packet without buffering regardless of the capture flag value. The filter unit 21 can be set the start/end of the capture by an external device (not illustrated), and the capture flag value in the rule table 40 can also be set by the external device.

As described above, in the first embodiment, because the time information used when time is stamped on each of the statistical information file and the capture file is supplied from the same time source, the statistical information and the capture data can be easily collated based on the pieces of stamped time information of the statistical information and the capture data, and traffic analysis using these pieces of information can be easily performed.

Because the packet analysis unit 11 and the flow identification unit 12 used for identifying the flow from which the statistical information is to be acquired are shared by the statistical information processing unit 10 and the packet capture unit 20 and the capture flag value can be configured by 1 bit, an increase in a memory capacity of the rule table 40 due to the sharing is only an increase by 1 bit for each recorded rule and not only a total memory amount and a circuit scale are reduced as compared with the related-art case in which the statistical information processing unit 10 and the packet capture unit 20 each include the rule table but also a device configuration with low power consumption can be achieved.

Operation of Traffic Monitoring Method

Figure 2:
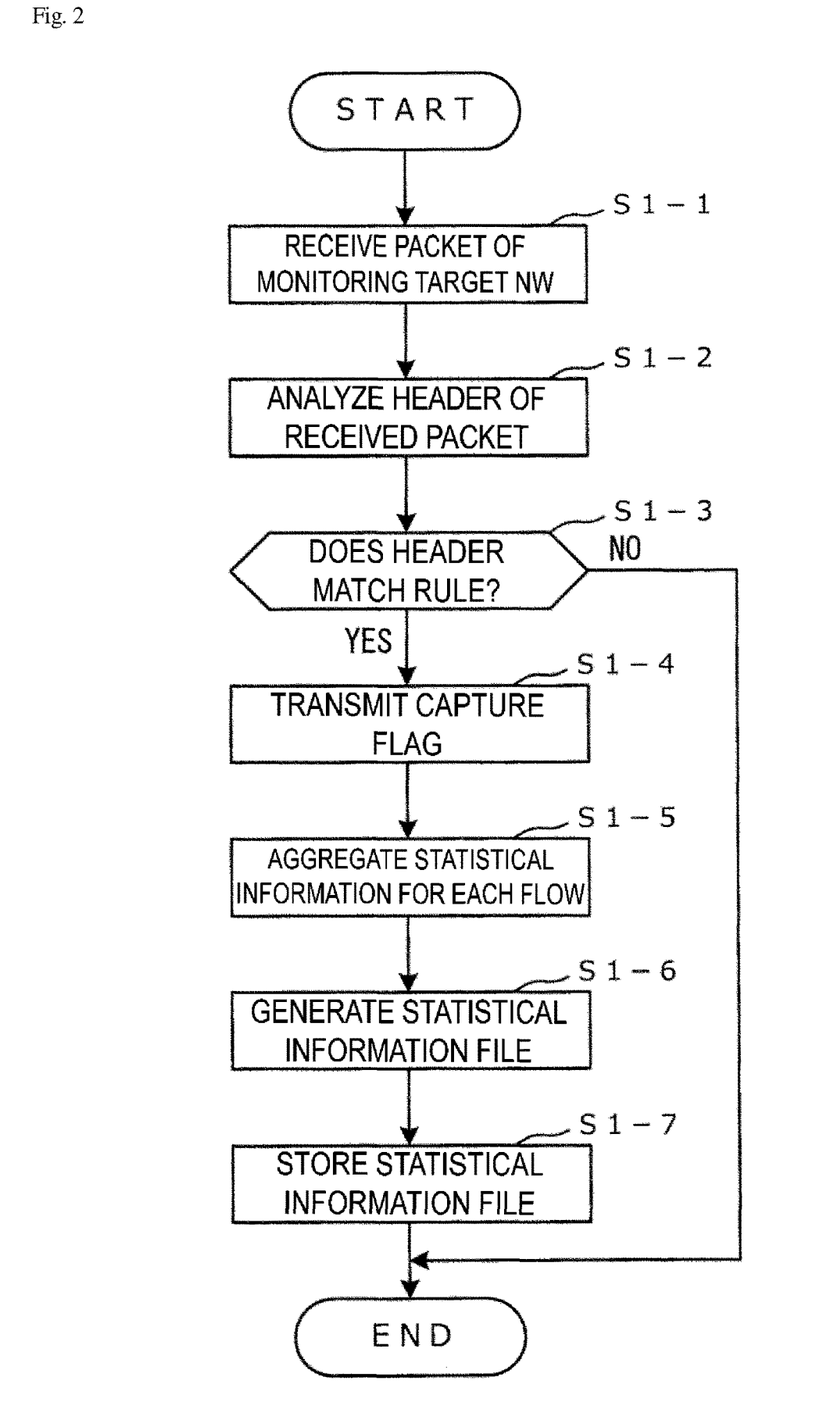
FIG. 2 is a flowchart illustrating an operation procedure in a statistical information processing unit according to the first embodiment of the present disclosure.
Figure 3:
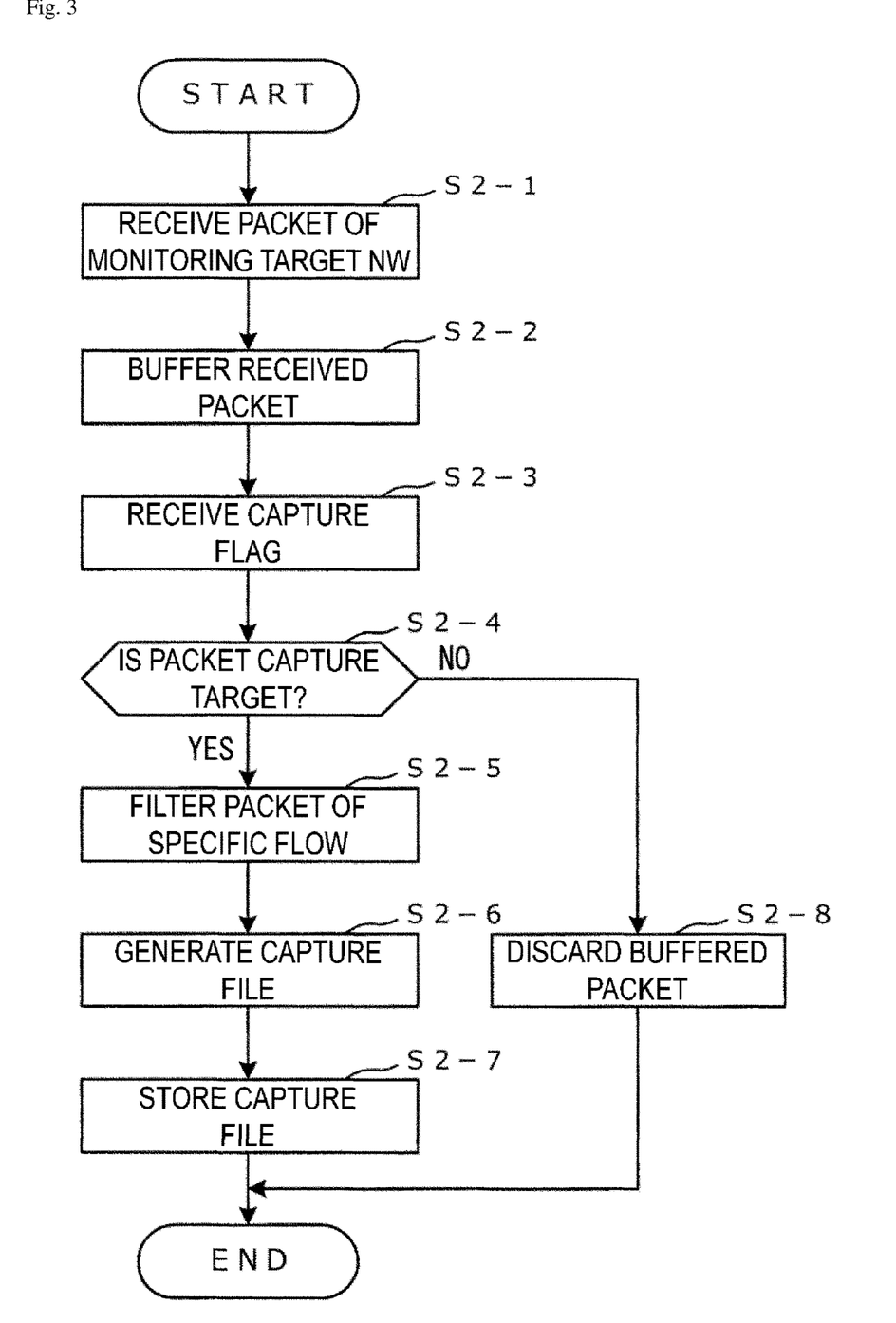
FIG. 3 is a flowchart illustrating an operation procedure in a packet capture unit according to the first embodiment of the present disclosure.

An operation of a traffic monitoring method according to the first embodiment will be described with reference to FIGS. 2 and 3. FIGS. 2 and 3 are flowcharts illustrating an operation procedure of the statistical information processing unit 10 and an operation procedure of the packet capture unit 20, respectively.

When the statistical information processing unit 10 receives the packet from the monitoring target network 80 (step S1-1), the statistical information processing unit 10 analyzes the header of the received packet to extract header information (step S1-2).

Next, the header extracted by the header analysis is compared with the rule in the rule table 40 (step S1-3), and when there is a matching rule, the statistical information is aggregated (step S1-5), the statistical information file is generated based on the statistical information aggregated in a predetermined period (step S1-6), and the generated statistical information file is stored in the storage unit 15 (step S1-7). When the header does not match the rule recorded in the rule table, the statistical information is not aggregated.

In the present embodiment, as a result of comparison with the rule table 40, when there is the matching rule, the packet capture unit 20 is notified of the capture flag value of the rule (step S1-4). When the header does not match the rule recorded in the rule table 40, the capture flag notified to the packet capture unit is 0.

When the packet capture unit 20 receives the packet from the monitoring target network 80 (step S2-1), the packet capture unit 20 buffers the received packet (step S2-2).

When the capture flag value for the buffered packet is received from the statistical information processing unit 10 (step S2-3) and the capture flag value is "1", that is, the capture target (S2-4: YES), the packet that is a capture target is filtered (step S2-5), a capture file is generated (step S2-6), and the generated capture file is stored in the storage unit 23 (step S2-7). When the capture flag value is "0" (step S2-4: NO), the packet is not filtered, and the buffered packet is discarded (step S2-8).

Here, because the statistical information processing unit 10 and the packet capture unit 20 generate the statistical information file and the capture file, respectively, by using the time information supplied from the same time source, collation of the statistical information and the capture data based on the stamped times performed by using these files becomes easy.

As a result, traffic monitoring processing can be simplified.

Figure 4:
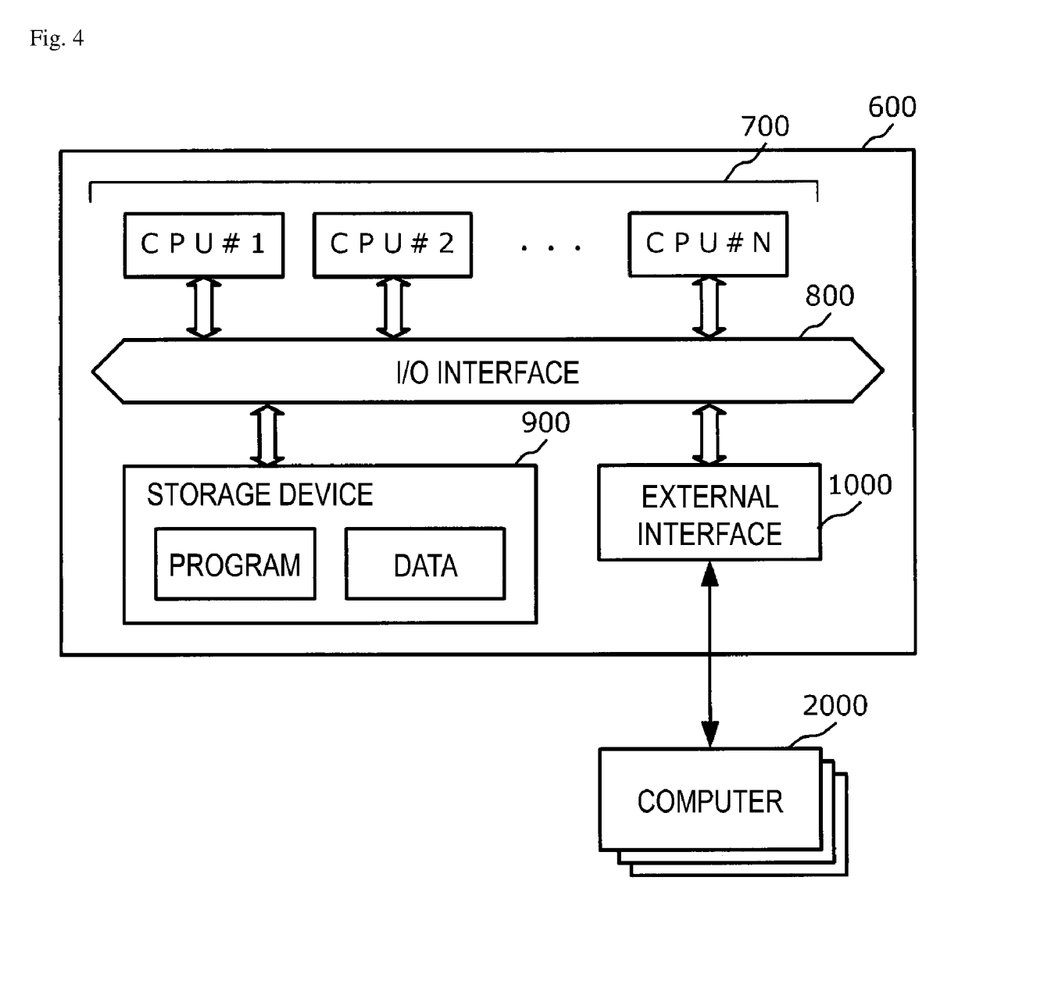
FIG. 4 is a configuration example of a computer for implementing the traffic monitoring apparatus according to the present embodiment.

As an example of the traffic monitoring apparatus 1 in the present embodiment, each unit of the statistical information processing unit 10 and the packet capture unit 20 can be implemented by a computer including a CPU (central processing unit), a storage device, and an external interface (hereinafter, external I/F), and programs for controlling these hardware resources. A configuration example of such a computer is illustrated in FIG. 4.

A computer 100 includes a CPU 200, a storage device 300, and an external I/F 400, which are connected to each other via an I/O interface 500. A program such as a traffic monitoring program for achieving the operation of the traffic monitoring apparatus 1 of the present embodiment and pieces of data such as the statistical information file and the capture file are stored in the storage device 300, and another computer that transmits and receives signals, a computer constituting a network, and the like are connected to the external I/F 400. The CPU 200 can execute the processing described in the present embodiment in accordance with a processing program or the like stored in the storage device 300. The processing program can be recorded in a computer-readable recording medium or provided through a network.

Second Embodiment

Figure 5:
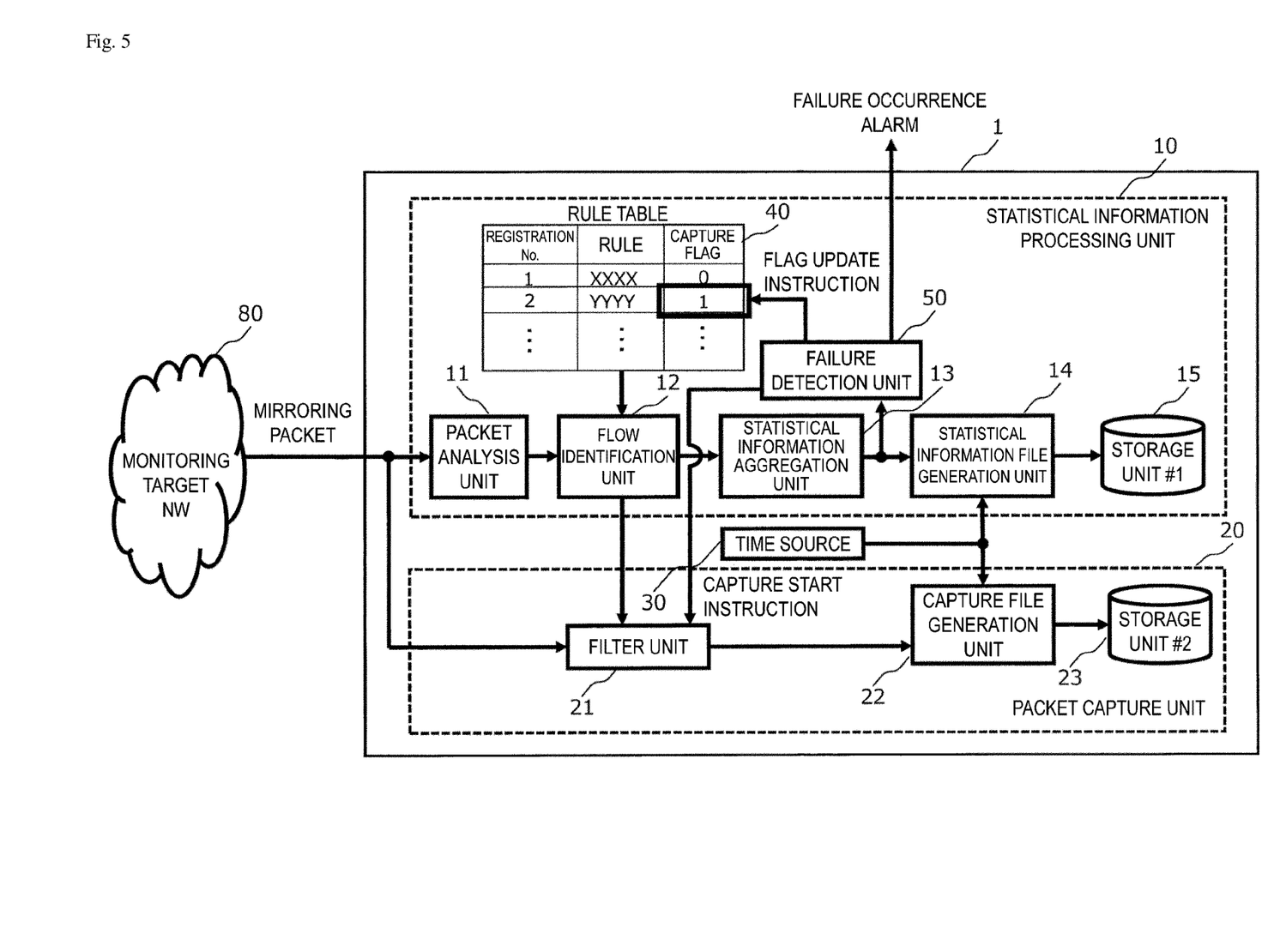
FIG. 5 is a block diagram illustrating a configuration of a traffic monitoring apparatus according to a second embodiment of the present disclosure.

FIG. 5 is a block diagram illustrating a configuration of a traffic monitoring apparatus according to a second embodiment of the present disclosure. The second embodiment differs from the first embodiment in that a failure detection unit 50 is newly provided. The failure detection unit 50 performs a capture flag update instruction in the rule table 40 and a capture start/end instruction on the packet capture unit.

The failure detection unit 50 acquires the statistical information for each flow from the statistical information aggregation unit 13 and detects a failure in the specific flow based on the acquired statistical information. For example, in a case where occurrence of a failure in the monitoring target network 80 is detected, such as a case where an input of a traffic amount greater than or equal to a predetermined threshold is detected or a case where when occurrence of jitter greater than or equal to a predetermined threshold is detected, after the capture flag of the rule table 40 is updated so as to update the capture flag value of the flow to 1, the start of capture is notified to the filter unit 21 of the packet capture unit 20, and a packet capture of the flow can be automatically started.

Along with these processing operations, an alarm of the occurrence of a failure may be output to the outside. The capture started by the notification from the failure detection unit 50 may be ended based on the end instruction from the outside or may be ended by the failure detection unit 50 detecting a resolution of the failure and performing the end instruction. For example, the failure detection unit 50 may detect that the traffic amount is less than or equal to the threshold and may notify the capture end instruction.

As described above, according to the second embodiment, the failure detection unit detects the failure of the specific flow and starts capturing the packet of the specific flow in which the failure has occurred, so that data for analyzing the flow in which the failure has occurred can be promptly collected, and a failure analysis period can be shortened.

Third Embodiment

Figure 6:
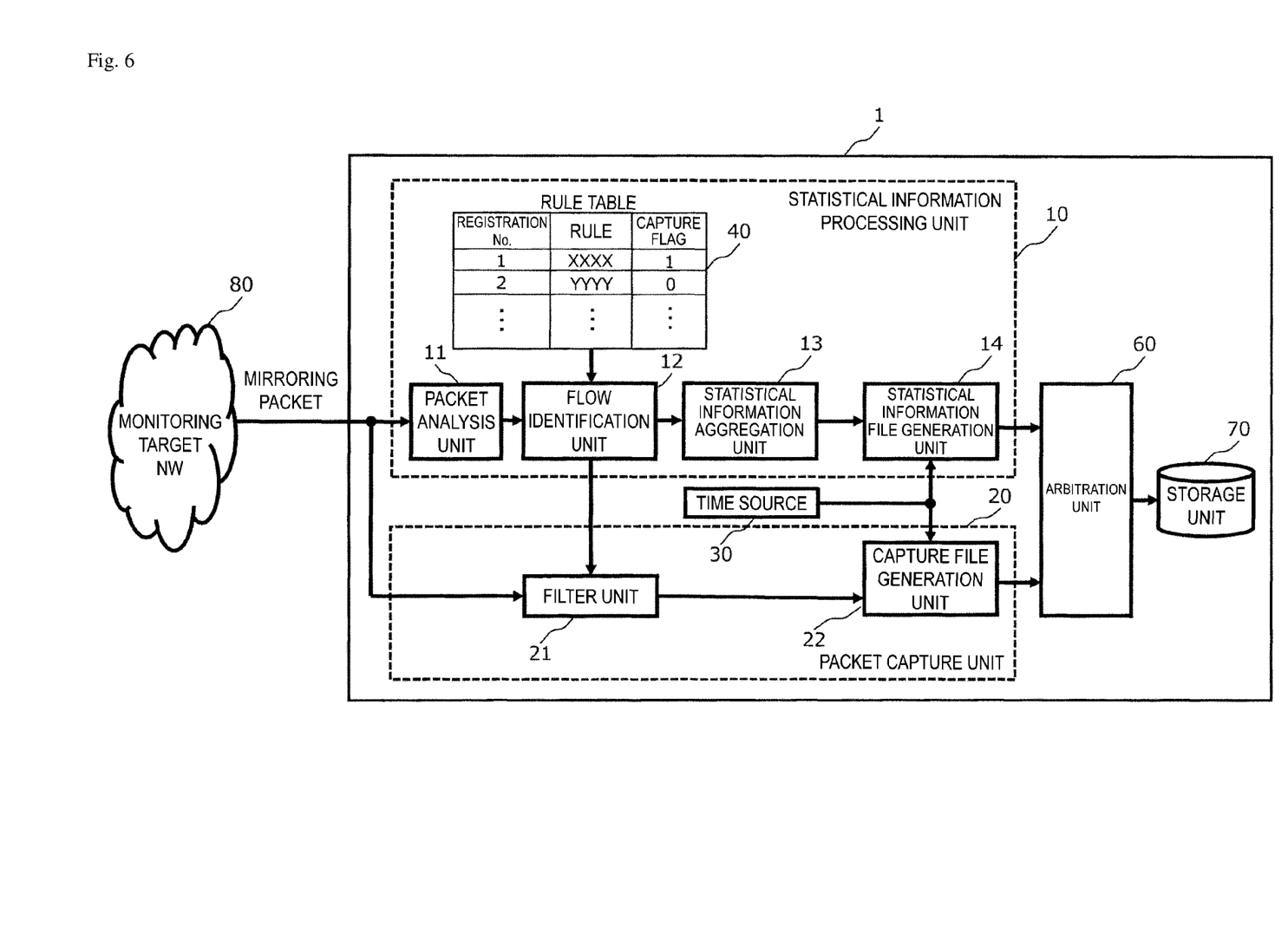
FIG. 6 is a block diagram illustrating a configuration of a traffic monitoring apparatus according to a third embodiment of the present disclosure.

FIG. 6 is a block diagram illustrating a configuration of a traffic monitoring apparatus according to a third embodiment of the present disclosure. The third embodiment differs from the first embodiment in that a storage unit 70 is shared by a statistical information processing function and a packet capture function, and an arbitration unit 60 that arbitrates output of a statistical information file and output of a capture file is provided. The arbitration unit 60 has a function of controlling a transmission timing of the file so as to transmit any one of the statistical information file and the capture file first when holding timings of the statistical information file and the capture file conflict with each other.

According to the third embodiment, because the storage unit 70 can be shared by the statistical information processing function and the packet capture function, it is possible to further reduce a total amount of memory and a circuit scale used for traffic analysis.

Expansion of Embodiment

The present disclosure has been described above with reference to the embodiments, but the present disclosure is not limited to the above-described embodiments. Various changes understood by a person skilled in the art within the scope of the present disclosure can be made to the configurations and details of the present disclosure.

REFERENCE SIGNS LIST

1 Traffic monitoring apparatus
10 Statistical information processing unit
11 Packet analysis unit
12 Flow identification unit
13 Statistical information aggregation unit
14 Statistical information file generation unit
15 Storage unit
20 Packet capture unit
21 Filter unit
22 Capture file generation unit
23 Storage unit
30 Time source
40 Rule table
80 Monitoring target network.

The invention claimed is:

1. A traffic monitoring apparatus configured to monitor traffic of a monitoring target network, the traffic monitoring apparatus comprising:
    a memory;
    a statistical information processor configured to acquire statistical information per specific flow of the traffic, wherein the statistical information processor includes:
        a statistical information aggregation circuit configured to aggregate a plurality of pieces of the statistical information; and
        a statistical information file generation circuit configured to generate a statistical information file based on the plurality of pieces of the statistical information aggregated by the statistical information aggregation circuit; and
    a packet capture circuit configured to capture a packet of the specific flow, wherein the packet capture circuit includes:
        a filter configured to filter the packet of the specific flow; and
        a capture file generation circuit configured to generate a capture file using the filtered packet, and
    wherein the statistical information file generation circuit is configured to generate the statistical information file in accordance with first time information, the capture file generation circuit is configured to generate the capture file in accordance with second time information, the first time information and the second time information are each supplied by an identical time source, and the statistical information processor, the packet capture circuit, and the identical time source are collectively disposed within a single device.

2. The traffic monitoring apparatus according to claim 1, wherein the statistical information processor includes:
    a rule table configured to record rules corresponding to the specific flow and a capture flag value indicating whether the specific flow is a capture target for each of the rules; and
    a flow identification circuit configured to identify the specific flow by comparing a rule of the rules recorded in the rule table with a header of an input packet and notify the filter of the capture flag value of the specific flow, wherein when the capture flag value represents the capture target, the filter transmits a packet of the specific flow that is the capture target to the capture file generation circuit and discards a packet of the specific flow that is not the capture target.

3. The traffic monitoring apparatus according to claim 2, wherein the statistical information processor includes a failure detection circuit configured to detect a failure in the specific flow based on the plurality of pieces of the statistical information, and wherein the failure detection circuit is further configured to update the capture flag value in the rule table of the specific flow where failure is detected to a value representing the capture target.

4. The traffic monitoring apparatus according to claim 3, wherein the failure detection circuit is further configured to notify the filter of a start to filter.

5. The traffic monitoring apparatus according to claim 1 further comprising:
    a storage configured to store the statistical information file and the capture file; and
    an arbitration circuit configured to perform arbitration when holding timings of the statistical information file and the capture file conflict with each other.

6. The traffic monitoring apparatus according to claim 1, wherein:
    the statistical information file includes the first time information supplied by the identical time source, the first time information indicating when aggregation of the plurality of pieces of the statistical information was completed; and the capture file includes the second time information supplied by the identical time source, the second time information indicating when the packet of the specific flow was filtered.

7. A traffic monitoring method in a traffic monitoring apparatus that monitors traffic of a monitoring target network, the traffic monitoring method comprising:

aggregating, by a statistical information processor of the traffic monitoring apparatus, a plurality of pieces of statistical information to generate a statistical information file based on the plurality of pieces of statistical information, wherein the traffic monitoring apparatus includes a statistical information processor configured to acquire the statistical information per the specific flow of the traffic and a packet capture circuit configured to capture the packet of the specific flow, wherein the traffic monitoring apparatus comprises a memory; and filtering, by the packet capture circuit of the traffic monitoring apparatus, the packet of the specific flow and generating a capture file based on the filtered packet, wherein the statistical information file is generated in the aggregating in accordance with first time information, the capture file is generated in the filtering in accordance with second time information, the first time information and the second time information are each supplied by an identical time source, and the statistical information processor, the packet capture circuit, and the identical time source are collectively disposed within a single device.

8. The traffic monitoring method according to claim 7, wherein the statistical information processor includes a rule table configured to record rules corresponding to the specific flow and a capture flag value indicating whether the specific flow is a capture target for each of the rules, and wherein the method further includes:

identifying the specific flow by comparing a rule of the rules recorded in the rule table with a header of an input packet.

9. The traffic monitoring method according to claim 8, wherein the method further includes:

detecting a failure in the specific flow based on the plurality of pieces of the statistical information; and updating the capture flag value in the rule table of the specific flow where failure is detected to a value representing the capture target.

10. The traffic monitoring method according to claim 8 further comprising:

storing the statistical information file and the capture file; and performing arbitration when holding timings of the statistical information file and the capture file conflict with each other.

11. The traffic monitoring method according to claim 7, wherein:

the statistical information file includes the first time information supplied by the identical time source, the first time information indicating when aggregation of the plurality of pieces of the statistical information was completed; and the capture file includes the second time information supplied by the identical time source, the second time information indicating when the packet of the specific flow was filtered.

12. A non-transitory computer-readable storage device storing a traffic monitoring program that when executed by one or more processors, cause the one or more processors to execute steps of:

acquiring statistical information per specific flow of traffic;

capturing a packet of the specific flow;

aggregating a plurality of pieces of the statistical information to generate a statistical information file based on the plurality of pieces of the statistical information; and filtering the packet of the specific flow and generating a capture file based on the filtered packet, wherein the statistical information file is generated in the aggregating in accordance with first time information, the capture file is generated in the filtering in accordance with second time information, the first time information and the second time information are each supplied by an identical time source, and the one or more processors and the identical time source are each disposed within a single device.

13. The computer-readable storage device according to claim 12, wherein the traffic monitoring program further causes the one or more processors to execute steps of:

identifying the specific flow by comparing a rule recorded in a rule table with a header of an input packet, wherein the rule table records rules corresponding to the specific flow and a capture flag value indicating whether the specific flow is a capture target for each of the rules.

14. The computer-readable storage device according to claim 13, wherein the traffic monitoring program further causes the one or more processors to execute steps of:

detecting a failure in the specific flow based on the plurality of pieces of the statistical information; and updating the capture flag value in the rule table of the specific flow where failure is detected to a value representing the capture target.

15. The computer-readable storage device according to claim 12, wherein the traffic monitoring program further causes the one or more processors to execute steps of:

storing the statistical information file and the capture file; and performing arbitration when holding timings of the statistical information file and the capture file conflict with each other.

16. The computer-readable storage device according to claim 12, wherein:

the statistical information file includes the first time information supplied by the identical time source, the first time information indicating when aggregation of the plurality of pieces of the statistical information was completed; and the capture file includes the second time information supplied by the identical time source, the second time information indicating when the packet of the specific flow was filtered.

* * * * *